(12) United States Patent
Hrabik

(10) Patent No.: US 12,236,432 B2
(45) Date of Patent: Feb. 25, 2025

(54) AUTOMATED CLOUD SECURITY COMPUTER SYSTEM FOR PROACTIVE RISK DETECTION AND ADAPTIVE RESPONSE TO RISKS AND METHOD OF USING SAME

(71) Applicant: SecureSky, Inc., Omaha, NE (US)

(72) Inventor: Michael J. Hrabik, Omaha, NE (US)

(73) Assignee: SecureSky, Inc., Omaha, NE (US)

( * ) Notice: Subject to any disclaimer, the term of this patent is extended or adjusted under 35 U.S.C. 154(b) by 0 days.

(21) Appl. No.: 18/207,461

(22) Filed: Jun. 8, 2023

(65) Prior Publication Data

US 2024/0020701 A1    Jan. 18, 2024

Related U.S. Application Data

(63) Continuation of application No. 17/306,817, filed on May 3, 2021, now Pat. No. 11,676,151, which is a
(Continued)

(51) Int. Cl.
| | |
|---|---|
| H04L 29/06 | (2006.01) |
| G06Q 20/40 | (2012.01) |
| H04L 9/40 | (2022.01) |

(52) U.S. Cl.
CPC ....... *G06Q 20/4016* (2013.01); *G06Q 20/405* (2013.01); *H04L 63/1425* (2013.01); *H04L 63/1433* (2013.01)

(58) Field of Classification Search
CPC ............ H04L 63/1425; H04L 63/1433; G06Q 20/4016
See application file for complete search history.

(56) References Cited

U.S. PATENT DOCUMENTS

| | | | | |
|---|---|---|---|---|
| 8,595,058 B2 * | 11/2013 | Fordyce, III | ....... | G06Q 30/0224 705/14.1 |
| 10,997,598 B2 | 5/2021 | Hrabik | | |

(Continued)

FOREIGN PATENT DOCUMENTS

| | | |
|---|---|---|
| CA | 3038397 A1 | 4/2017 |
| CA | 3029017 A1 | 1/2018 |

OTHER PUBLICATIONS

International Preliminary Report on Patentability received for PCT Patent Application No. PCT/US2019/045299, mailed on Feb. 18, 2021, 6 pages.

(Continued)

*Primary Examiner* — Jason K Gee
(74) *Attorney, Agent, or Firm* — DLA Piper LLP (US)

(57) ABSTRACT

The present disclosure relates to techniques for automated and adaptive cloud security management. Embodiments provide for, at an electronic device configured to interface with a cloud computing environment, initiating one or more transactions in the cloud computing environment using a first identifier to cause a first service of the cloud computing environment to generate a first set of data including the first identifier and a second identifier, and a second service of the cloud computing environment to generate a second set of data including a third identifier and a fourth identifier. Embodiments also provide for automatically determining whether the first identifier corresponds to the third identifier, and, in accordance with a determination that the first identifier corresponds to the third identifier, associating the second identifier and the fourth identifier to generate a linkage between the first and second services.

42 Claims, 6 Drawing Sheets

Related U.S. Application Data continuation of application No. 16/532,282, filed on Aug. 5, 2019, now Pat. No. 10,997,598.

(60) Provisional application No. 62/715,045, filed on Aug. 6, 2018.

(56) References Cited

U.S. PATENT DOCUMENTS

| | | |
|---|---|---|
| 11,676,151 B2 | 6/2023 | Hrabik |
| 2007/0073519 A1* | 3/2007 | Long ............... G06F 11/3636 |
| | | 702/185 |
| 2011/0185016 A1* | 7/2011 | Kandasamy ........... G06Q 10/06 |
| | | 709/203 |
| 2014/0280871 A1* | 9/2014 | Brown ................. H04L 67/10 |
| | | 709/224 |
| 2015/0026181 A1* | 1/2015 | Milton ............. G06F 16/2379 |
| | | 707/736 |
| 2017/0295173 A1 | 10/2017 | Walsh et al. |
| 2018/0032734 A1 | 2/2018 | Gunti et al. |
| 2018/0157713 A1 | 6/2018 | Huang et al. |

OTHER PUBLICATIONS

International Search Report and Written Opinion received for PCT Patent Application No. PCT/US2019/045299, mailed on Oct. 22, 2019, 16 pages.

Non-Final Office Action received for U.S. Appl. No. 16/532,282, mailed on Jun. 16, 2020, 7 pages.

Non-Final Office Action received for U.S. Appl. No. 17/306,817, mailed on Oct. 3, 2022, 7 pages.

Notice of Allowance received for U.S. Appl. No. 16/532,282, mailed on Jan. 11, 2011, 7 pages.

Notice of Allowance received for U.S. Appl. No. 17/306,817, mailed on Feb. 1, 2023, 7 pages.

* cited by examiner

| Synthetic Marker | Asset Linkage | Relationships and Privileges Discovery |
|---|---|---|
| SyntheticNameMarker | User=accountid=accesskeyid=principalId=KeyID=First_UserAgent=SourceIP | SyntheticNameMarker=accountid=principalId=First-SourceIPAddress=First-UserAgent User-Newuser=group |
| Start AWS Instance | Add New User AWS | Add New User to Admin Group |
| {"Records":[{ "eventVersion": "1.0", "userIdentity":{ "type": "IAMUser","arn": "arn:aws:iam:::user/[SyntheticNameMarker]", "userName": [SyntheticNameMarker] }, | {"Records":[{ "eventVersion": "1.0", "userIdentify": { "type": "IAMUser", "principalId": "EX_PRINCIPAL_ID", "arn": "arn:aws:iam::user/[SyntheticNameMarker]", "accountId": "123456789012" "accessKeyId": "SynName_KEY_ID", "userName": [SyntheticNameMarker]" }, | {"Records":[{ "eventVersion": "1.0", "userIdentity":{ "type": "IAMUser", "principalId": "EX_PRINCIPAL_ID", "arn": "arn:aws:iam::123456789012:user/[SyntheticNameMarker]", ", "accountId": "123456789012", "accessKeyId": "SynName_KEY_ID", "userName": [SyntheticNameMarker]", ", "sessionContext": {"attributes": {"mfaAuthenticated": "false", |
| "eventTime": "2018-03-24T21:11:59Z" | "eventTime": "2018-03-24T21:11:59Z", | "creationDate": "2018-03-25T18:45:11Z", "eventTime": "2018-03-25T21:08:14Z", |
| "eventSource" : "ec2.amazonaws.com", "awsRegion": "us-east-2", sourceIPAddress" : "72.21.198.64", "userAgent" : "EC2ConsoleBackend, aws-sdk-java/Linux/x.xx.fleetxen java_HotSpot(TM)_64-Bit_Server_VM/xx", | "eventSource": "iam.amazonaws.com", "eventName": "CreateUser", "awsRegion": "us-east-2", "sourceIPAddress": "127.0.0.1", "userAgent": "aws-cli/1.3.2 Python/2.7.5 Windows/7", | "eventSource": cloudtrail.amazonaws.com", "eventName": "UpdateTrail", "awsRegion": "us-east-2", "sourceIPAddress": "205.251.233.182", "userAgent": "aws-cli/1.10.32 Python/2.7.9 Windows/7 botocore/1.4.22", |
| "requestParameters": {"instancesSet": {"items": [{"instanceId": "i-ebeaf9e2"}]}}, "responseElements": {"instancesSet":{"items": [{ "instanceId": "i-ebeaf9e2", "currentState": { "code" }]} | "requestParameters": {"userName": [SyntheticNewNameMarker]"}, "responseElements": {"user": { "createDate": "Mar 24, 2018 9:11:59 PM","userName":" [SyntheticNewNameMarker]" "arn": "arn:aws:iam::123456789014:user/SyntheticNewNameMarker" ,"path": "/", "userId": "EXAMPLENewUSERID | "requestParameters": { "userName": [SyntheticNewNameMarker] "groupName": "admin" }, "responseElements": null }]} |

| Asset - Discovery |
|---|
| Ec2.amazonaws.om - 72.21.198.64 - [awsRegion] - [useragent] |
| Ec2.amazonaws.com - 205.251.233.176 - [awsRegion] - [useragent] |
| lqm-amzonaws.com -127.0.0.1 - [awsRegion] - [useragent] |
| Cloudtrail.amazonaws.com - 205.251.233.182- [awsRegion] - [useragent] |
| User=accountId=iamid=KeyID=UserAgent=SourceIP=newuser=iam |

| Add User to O365 / SharePoint | Add User to O365 Group |
|---|---|
| CorrelationId:132824c5-fecb-4494-84e8-65af48db4583132824c5-fecb-4494-84e8-65af48db4583;Category : Core DirectoryCore Directory Status : SuccessSuccess; Reason : Initiated By (Actor);Type : UserUser;ObjectId : 0df00c55-2ab5-40b3-9083c5a9f9b4dba10df00c55-2ab5-40b3-9083-c5a9f9b4dba1;Upn:mhrabik@AdaptiveResponse.io mhrabik@AdaptiveResponse.io;IpAddress : <null><null>Type : UserUser;ObjectId : 7bb647ee-428d-44dd-8f71-5d3b4200a88c;7bb647ee-428d-44dd-8f71-5d3b4200a88c;Upn :SyntheticNameMarke@AdaptiveResponse.io; SyntheticNameMarke@AdaptiveResponse.io; Modified Properties;Name: AccountEnabled; AccountEnabled;Old Value : [[]];New Value:[true][true];Name;StsRefreshTokensValidFromStsRefreshTokensValidFrom;Old Value : [[]];New Value : ["2018-07-31T16:50:59Z"]["2018-07-31T16:50:59Z"]Name : UserPrincipalName; UserPrincipalName;Old Value : [[]];New Value : [" SyntheticNameMarke@AdaptiveResponse.io"; SyntheticNameMarke@AdaptiveResponse.io"]; Name : UserTypeUserType; Old Value : [[]];New Value : ["Member"]["Member"];Name : Included Updated PropertiesIncluded Updated Properties;New Value : "AccountEnabled, StsRefreshTokensValidFrom, UserPrincipalName, UserType""AccountEnabled,StsRefreshTokensValid From, UserPrincipalName, UserType"; | [{"Date":"2018-07-06 10:23:35",IP address:" ","User":mhrabik@AdaptiveResponse.io","Activity": "Added member to group","Item": SyntheticNameMarker@AdaptiveResponse.io"} {"ID": mhrabik@AdaptiveResponse.io, "Type": 5}, {"ID":"10030000AB5835E1","Type": 3},{"ID": "Microsoft Office 365 Portal", "Type": 1},{"ID": "00000006-0000-0ff1-ce00-000000000000", "Type": 4}{"ID": "User_0df00c55-2ab5-40b3-9083-c5a9f9b4dba1","Type": 2}]["ActorContextId" :"6d1175a2-0fdd-4aab-993c547cdc270cbc", "AzureActiveDirectoryEventType":"1","Creation Time ":" 2018-07-06T15:23:35"}{"Name":"Group.ObjectID" ,"Value": "a9ad9429-652f-4fb2-9897-5237ff0d9ce6"}, {"Name": b"Group.DisplayName","Value": "Student Intern"}] [{"id":" 5ebc619f-a86d-496e-a2db--f0abaeee4c0","InterSystemsid":"7385ac5e-8315-417e-85 34- ef9ccbf706dc","IntraSystemId": "27540c19-1e64-4ab9-848c-365c2728fccb","ObjectId": SyntheticNameMarker @AdaptiveResponse.io, "Operation":"Add member to group.", "Organization" : " 6d1175a2-0fdd-4aab-993c-547cdc270cbc","RecordType" :"8", "Result Status" :"success"]["ID": "User_7bb647ee-428d-44dd-8f71-5d3b4200a88c","Type ": 2}, {"ID": SyntheticNameMarker @AdaptiveResponse.io", "Type": 5},{"ID":"10033FFFAC9D7C3D","Type": 3}] [{"TargetContextId":"6d1175a2-0fdd-4aab-993c-547cdc2 70cbc","UserId":mhrabik@AdaptiveResponse. io,"UserKey" :10030000AB5835E1@AdaptiveResponse. io,"UserType":"0","Version":"1","Workload":"AzureActive Directory" |

AUTOMATED CLOUD SECURITY COMPUTER SYSTEM FOR PROACTIVE RISK DETECTION AND ADAPTIVE RESPONSE TO RISKS AND METHOD OF USING SAME

CROSS-REFERENCE TO RELATED APPLICATION

The present application is a continuation of U.S. application Ser. No. 17/306,817, filed May 3, 2021, and entitled, "AUTOMATED CLOUD SECURITY COMPUTER SYSTEM FOR PROACTIVE RISK DETECTION AND ADAPTIVE RESPONSE TO RISKS AND METHOD OF USING SAME," which is a continuation of U.S. application Ser. No. 16/532,282, filed Aug. 5, 2019, now U.S. Pat. No. 10,997,598 and entitled, "AUTOMATED CLOUD SECURITY COMPUTER SYSTEM FOR PROACTIVE RISK DETECTION AND ADAPTIVE RESPONSE TO RISKS AND METHOD OF USING SAME," which claims priority to U.S. Provisional Application No. 62/715,045, filed Aug. 6, 2018 and entitled, "AUTOMATED CLOUD SECURITY COMPUTER SYSTEM FOR PROACTIVE RISK DETECTION AND ADAPTIVE RESPONSE TO RISKS AND METHOD OF USING SAME," the disclosures of which are incorporated by reference herein in their entireties for any purpose.

FIELD

The present invention relates to computer systems, methods, and program products that provide automated cloud security by detecting risks to cloud infrastructure, applications, and connected devices and adaptively responding to detected risks with attempts at remediation.

BACKGROUND

In many instances, computer systems, Operation Technology (OT) and Internet of Things (IoT) devices, and computer networks are vulnerable to security risks of various types that can adversely affect the systems and networks, for instance, through damage to the hardware or software of the systems and networks. This may in turn lead to risks of data breaches, intrusions or loss. As used herein, the term "risk" may include, but is not limited to, a vulnerability, misconfiguration, security threat, or anomaly, that increases the likelihood of system vulnerability with respect to a security breach, malware attack, data corruption and/or loss, improper execution, or any combination thereof. The potential for risk increases as the number of devices, systems, and applications proliferate, and those wishing to exploit these risks become more brazen and sophisticated.

SUMMARY

The present disclosure describes techniques for automated and adaptive cloud security management that may facilitate detecting risks to cloud infrastructure, applications, and connected devices in a distributed cloud environment, and adaptively responding and updating security models of the cloud environment based on the detected risks. In aspects of the present disclosure, detecting risks to cloud infrastructure may include determining a cloud-based system characteristics (e.g., system's assets, configuration, policies, vulnerabilities, etc.). The determined characteristics may then be used to validate a security model of the system, or a particular security control of the security model, in order to determine whether the security model is valid, whether the security model is being applied to the system properly, and/or whether the security model is deficient or broken. In some aspects, the security model validation results may be used to update the security model in an automated and adaptive process. In one particular example, a security model may be developed and applied for dealing with a particular risk and/or threats (e.g., hacker, virus, etc.) that seek to exploit vulnerabilities of the system. In aspects, the security model may be adaptively updated based on the system characteristics to mitigate such risks, but may also, in response to a threat, detect the threat in real-time and, as the attack is occurring, update and/or modify the security model and/or the system to protect the system from the threat. In this manner, the automated and adaptive cloud security management of embodiments may not only provide for an adaptive security model based on system characteristics to deal with risk, but may also provide a dynamic and adaptive security model to respond to threats in real-time.

In some embodiments, determining a cloud-based system characteristics may include applying synthetic testing to proactively discover identity linkages, relationships, transaction flows, etc. within the distributed system. In general, synthetic testing may include initializing various operations (e.g., transactions involving the cloud-based system) using a synthetic marker, and then reviewing the results of the simulated operations (e.g., an output and/or log data associated with the operations) to determine system characteristics.

Example methods are described herein. An example method includes, at an electronic device configured to interface with a cloud computing environment, initiating one or more transactions in the cloud computing environment using a first identifier to cause a first service of the cloud computing environment to generate a first set of data including the first identifier and a second identifier, and a second service of the cloud computing environment to generate a second set of data including a third identifier and a fourth identifier. The example method also includes automatically determining whether the first identifier corresponds to the third identifier, and, in accordance with a determination that the first identifier corresponds to the third identifier, associating the second identifier and the fourth identifier.

In some embodiments, one or more non-transitory computer-readable media are described. The one or more non-transitory computer-readable storage media comprise one or more programs for execution by one or more processors of at least one electronic device configured to interface with a cloud computing environment. The one or more programs include instructions for initiating one or more transactions in the cloud computing environment using a first identifier to cause a first service of the cloud computing environment to generate a first set of data including the first identifier and a second identifier, and a second service of the cloud computing environment to generate a second set of data including a third identifier and a fourth identifier. The one or more programs also include instructions for automatically determining whether the first identifier corresponds to the third identifier, and in accordance with a determination that the first identifier corresponds to the third identifier, associating the second identifier and the fourth identifier.

Example devices are described herein. An example device (e.g., a system) comprises at least one processor and memory communicatively coupled to the at least one processor. The memory stores one or more programs, and the one or more programs include instructions which, when executed by the one or more processors, cause the electronic device to initiate one or more transactions in the cloud computing environment using a first identifier to cause a first service of the cloud computing environment to generate a first set of data including the first identifier and a second identifier, and a second service of the cloud computing environment to generate a second set of data including a third identifier and a fourth identifier. The instructions also cause the electronic device to automatically determine whether the first identifier corresponds to the third identifier, and, in accordance with a determination that the first identifier corresponds to the third identifier, associate the second identifier and the fourth identifier.

The foregoing broadly outlines the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

In the following description, reference is made to the accompanying drawings which form a part thereof, and which illustrate several examples of the present disclosure. It is understood that other examples may be utilized and structural and operational changes may be made without departing from the scope of the present disclosure. The use of the same reference symbols in different drawings indicates similar or identical items.

FIGS. 5A-5B illustrate and example of a use of synthetic markers to taint a transaction for synthetic testing in accordance with embodiments of the present disclosure.

DETAILED DESCRIPTION

Figure 1A:
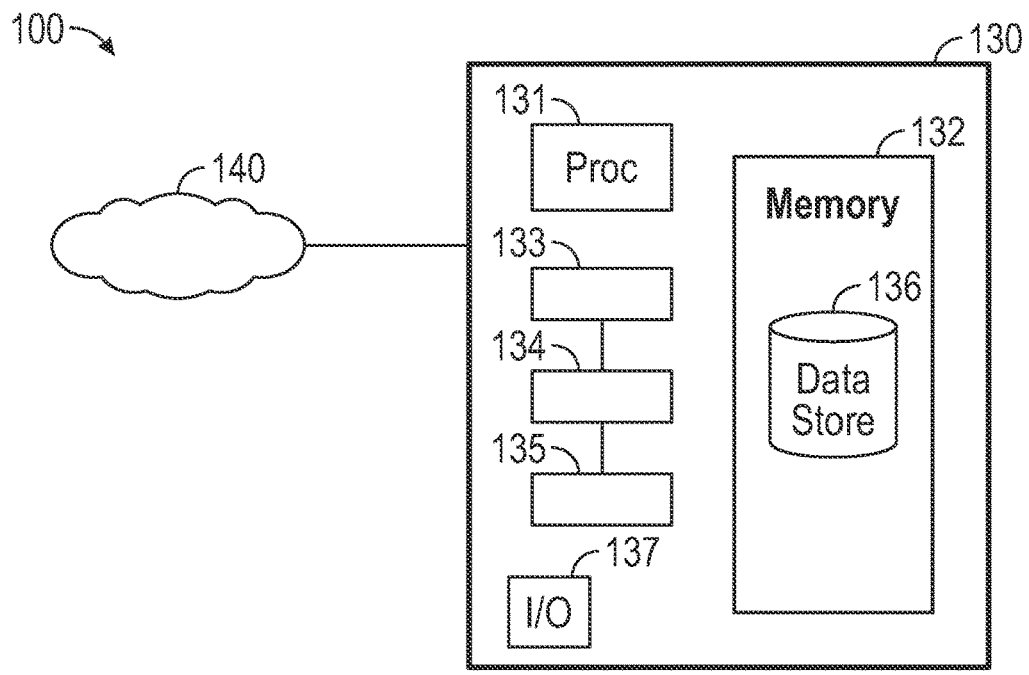
FIG. 1A is a block diagram illustrating an exemplary computing environment in accordance with embodiments of the present disclosure.

In the following description of examples, reference is made to the accompanying drawings in which are shown by way of illustration specific examples that can be practiced. It is to be understood that other examples can be used and structural changes can be made without departing from the scope of the various examples.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Aspects of the present disclosure provide techniques for automated and adaptive cloud security management that may facilitate detecting risks and/or threats to cloud infrastructure, applications, and connected devices in a distributed cloud environment, and adaptively responding and updating security models of the cloud environment based on the detected risks and/or threats and based on the system characteristics. In particular aspects of the present disclosure, detecting risks and/or threats to cloud infrastructure may include leveraging native cloud security tools in order to determine a cloud-based system characteristics (e.g., system's assets, configuration, policies, vulnerabilities, etc.). The determined characteristics may then be used to validate a security model of the system, or a particular security control of the security model, in order to determine whether the security model is valid, whether the security model is being applied to the system properly, and/or whether the security model is deficient (e.g., is not working, or is insufficient to mitigate and/or stop the risks and/or threats).

In some aspects, the security model validation results may be used to update the security model in an automated and adaptive process.

In some embodiments of the present disclosure, determining a cloud-based system characteristics may include applying synthetic testing to proactively discover identity linkages, relationships, transaction flows, etc. within the distributed system. In general, synthetic testing may include simulating various operations (e.g., transactions involving the cloud-based system) using a synthetic marker, and then reviewing the results of the simulated operations (e.g., an output and/or log data associated with the operations) to determine the system characteristics. Particular embodiments of synthetic testing will be described in more detail below.

As noted above, aspects of the present disclosure are, in some instances, advantageous in a distributed environment (e.g., a cloud-environment), in which applications and related infrastructure are distributed over more than one system and/or components. With that in mind, it will be appreciated that although various components of the various systems illustrated in the present disclosure are illustrated as single and separate components, each of the various illustrated components may be implemented as a single component (e.g., a single application, server, etc.), may be functional components of a single component, or may be distributed over multiple devices, systems, and/or components.

In particular, FIG. 1A is a block diagram illustrating an exemplary system 100 according to embodiments of the present disclosure. In aspects, system 100 may include cloud 140, and server 130 configured to provide automated cloud security management functionality in accordance with aspects of the present disclosure. As discussed above, and although server 130 is illustrated as a single component, server 130 and/or its individual functional blocks may be implemented as a single device or may be distributed over multiple devices having their own processing resources (e.g., systems/devices of cloud-based system 140), whose aggregate functionality may be configured to perform operations in accordance with the present disclosure.

Server 130 may include processor 131, memory 132, proactive protection servicer 133, security model validator 134, and security model adaptor 135. Processor 131 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, as noted above, implementations of processor 131 may comprise code segments (e.g., software, firmware, and/or hardware logic) executable in hardware, such as a processor, to perform the tasks and functions described herein. In yet other aspects, processor 131 may be implemented as a combination of hardware and software. In some implementations, processor 131 may be distributed over various systems and/or components (e.g., in a cloud-based computing environment) whose processing functionality may be aggregated to provide the functionality of processor 131. It is noted that although server 130 is illustrated as a separate component communicatively coupled to cloud 140, in some aspects, as described above, server 130 may be part of cloud 140. Processor 131 may be communicatively coupled to memory 132.

Memory 132 may comprise one or more semiconductor memory devices, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or a combination of different memory devices. Memory 132 may comprise a processor readable medium configured to store one or more instruction sets (e.g., software, firmware, etc.) which, when executed by a processor (e.g., one or more processors of processor 131), perform tasks and functions as described herein. In aspects, memory 132 may be distributed over various cloud-based components/systems. In this regard, memory 132 may include one or more non-transitory memory storage devices (e.g., distributed over one or more systems of a cloud-based system) from which computer-readable instructions may be read and executed by processor 131.

In aspects, memory 132 may include data store 136 for storing electronic data associated with the functionality of server 130. In embodiments, data store 136 may include, for example, data with regard to assets in or communicating with cloud 140, security data regarding security vulnerabilities, adaptive protection data for generating and storing an updated security model for implementation and testing on the assets in cloud 140 and the cloud-connected assets, etc. It will be understood that while a single data store 136 is shown, this is not intended to be limiting in any way. Instead, it will be appreciated that electronic data may be stored on multiple data stores, which may be incorporated within server 130, or which may be in electronic communication with server 130, or which may be distributed over several components across various systems (e.g., systems/components of cloud 140) whose functionality may be aggregated to provide the functionality described herein with respect to data store 136. Each data store 136 or more than one data store may include one or more databases.

In aspects, server 130 may include input devices (e.g., keyboards, mice, touchscreens, microphones, cameras) and/or output devices (e.g., display devices, speakers), not shown, and may include respective interface modules configured to generate or update user interfaces or to generate and/or transmit machine-readable instructions to be used to generate and/or update graphical user interfaces at one or more portions thereof.

Server 130 may also include input/output (I/O) interface 137, via which electronic data may be transmitted. For example, I/O interface 137 may be configured to provide an administrator interface via which a user with administrative privileges may access, service, update, and/or otherwise electronically engage with server 130. As described herein, electronic communications transmitted from or received by server 130 may employ actions of I/O interface 137.

Server 130 may also include an application programming interface (API) engine (not shown) configured to provide one or more APIs for interaction, such as via one or more gateways, with cloud 140 and devices and providers connected to cloud 140, and/or with devices such as a server or program product external to server 130, for example, an application or program product stored on a device or network that may be accessed outside of cloud 140. In embodiments, the API interface may also facilitate communications between server 130 and a security operations center (SOC). In some embodiments, the API interface may be further configured to work with other computing systems outside of cloud 140, such as with a mobile platform, an Internet website, one or more third party services, etc.

As mentioned above, aspects of the present disclosure are, in some instances, advantageous in a distributed environment (e.g., a cloud-environment of cloud 140). In addition, and although server 130 is illustrated as a separate component communicatively coupled to cloud 140, server 130 may be part of the distributed environment of cloud 140. The distributed environment of cloud 140 will now be discussed with respect to FIGS. 1B, 1C, and 2.

Figure 1B:
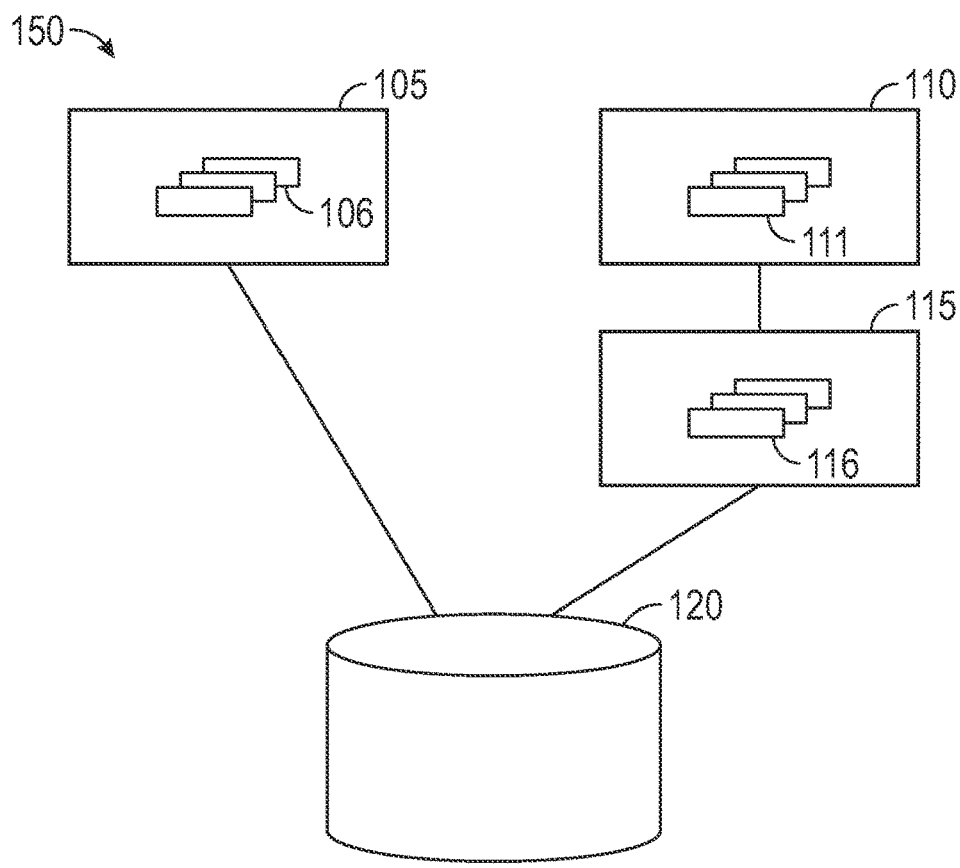
FIG. 1B is a block diagram illustrating another exemplary computing environment in accordance with embodiments of the present disclosure.

FIG. 1B is a block diagram illustrating an exemplary computing environment 150 according to embodiments of the present disclosure. Generally, computing environment 150 provides a platform by which single-tiered and multi-tiered applications may be utilized, for instance, by users. As an example, applications 106 may be deployed on one or more servers 105 as self-contained, single-tiered applications and may access monolithic database 120 for storage operations. As another example, applications 111 and 116 may be deployed in a three-tier application scheme on servers 110 and servers 115, respectively, and access monolithic database 120 for storage operations. Applications 111 may, for instance, include applications directed to a presentation tier of a three tier application scheme and applications 116 may include applications directed to an application tier of a three tier application scheme. In aspects, the three tier application scheme may include a user interface on the user device, the database and related programming on another device or server, and backend logic on a server.

Figure 1C:
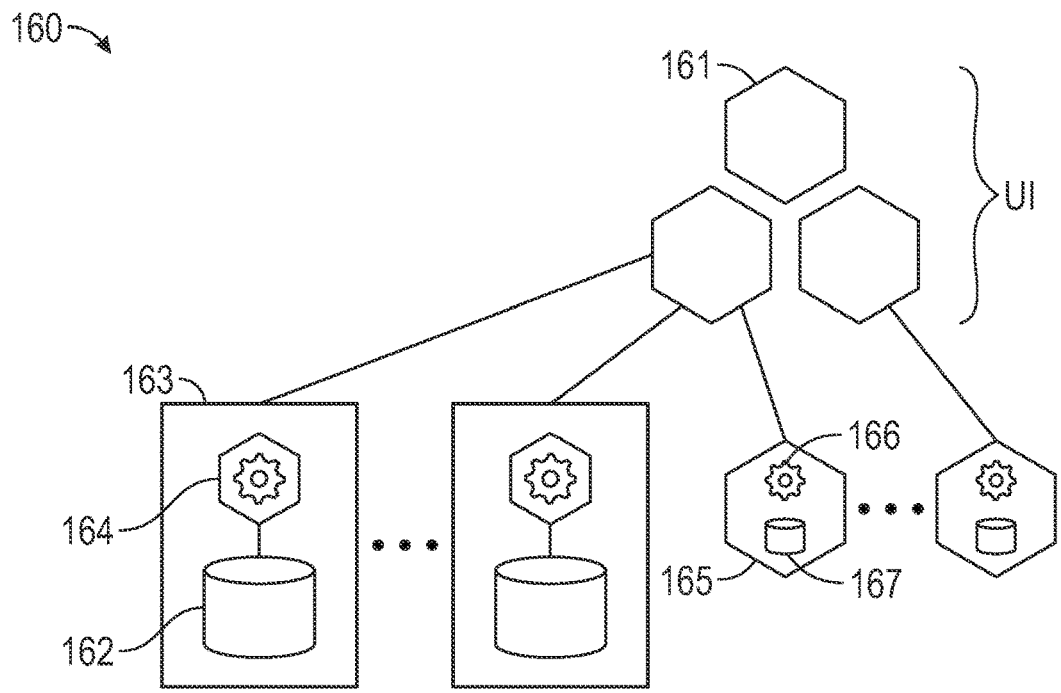
FIG. 1C is a block diagram illustrating yet another exemplary computing environment in accordance with embodiments of the present disclosure.

While the application architecture(s) illustrated in FIG. 1B remain widely used for application deployment, many applications are deployed instead using a more distributed, microservices architecture, allowing for increased scalability. FIG. 1C, for instance, is a block diagram illustrating an exemplary computing environment 160 according to an embodiment of the present invention. Generally, the computing environment 160 provides a platform by which one or more applications may be deployed using a collection of services implemented across various servers and databases, respectively. In this manner, applications may be provided to users as "Software as a Service" (SaaS), infrastructure as a service (IaaS), "Platform as a Service" (PaaS), and/or "Function as a Service" (FaaS). In some aspects, any of the SaaS, IaaS, and PaaS may include platforms that are external to the cloud-based system (e.g., provided by 3-parties). In an example operation of an application, a user may access presentation services 161, for instance, with a user device (e.g., computer, mobile device, tablet and the like). The presentation services 161 may in turn provide one or more user interfaces through which a user can interact with the application. In response to user requests, the presentation services 161 may access stateless services 163 and/or stateful services 165. Stateless services 163 may each include a service 164 for handling requests (e.g., API calls) received from the presentation services 161 and one or more related databases 162 (e.g., stateless service cache.) Stateful services 165 may include a service 166 and one or more databases 167. In some examples, services 164 and databases 162 may be deployed on separate servers and/or services 166 and databases 167 may be deployed on separate servers. As such, the computing environment of computing environment 160 may be distributed over different systems and/or servers and databases.

Yet another distributed architecture being used by many application deployments includes cloud-based computing, where applications may be accessible on a cloud (e.g., cloud 140). Cloud-based architectures may facilitate a reduction of resource and maintenance needs for users, may allow easier updating of applications, and may provide access to applications regardless of location. In cloud-based computing, network boundaries are less relevant than in conventional distributed systems. Cloud-based computing may use a managed security services (MSS) architecture or a microservices architecture and/or configuration.

Figure 2:
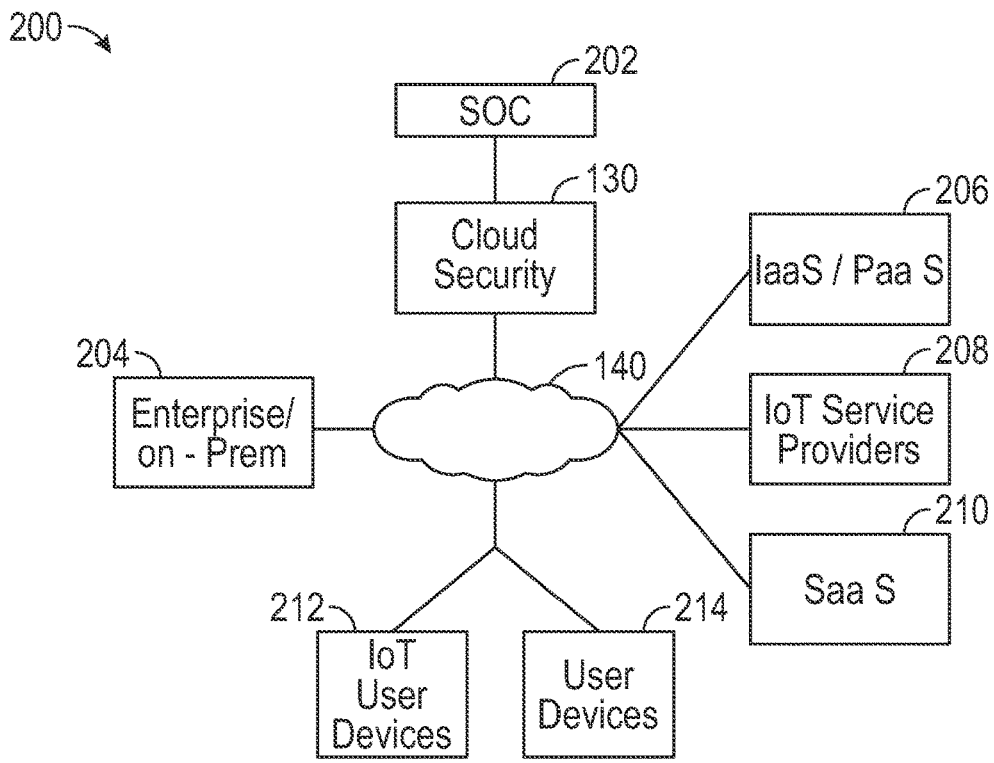
FIG. 2 is a block diagram illustrating still another exemplary computing environment in accordance with embodiments of the present disclosure.

FIG. 2 is a block diagram illustrating an exemplary computing environment 200 implemented in accordance with embodiments of the present disclosure. System 200 may be implemented as a cloud-based system that may include cloud 140. Although the various components of system 200 are illustrated as single and separate components communicatively coupled to cloud 140, it will be appreciated that each of these components may be implemented as part of cloud 140, and/or as part of another cloud. As such, any of the various components of system 200 may be distributed over various systems/components of cloud 140 (or another cloud) in a distributed manner as described above. Therefore, the description of the various components of system 200 as single and separate components coupled to cloud 140 is done by way of illustration, and should not be construed as limiting in any way.

In embodiments, system 200 may include server 130, as described above, configured to provide automated security management across the multiple components of cloud-based system 200 in accordance with aspects of the present disclosure. In aspects, server 130 may be communicatively coupled to security operations center (SOC) 202. SOC 202 may be operated by a certified managed security services provider and may provide, in cooperation with server 130, functionality to perform automated self-tuning SOC operations for the security operations associated with system 200.

System 200 may also include user devices 214. User devices 214 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. System 200 may also include I/O devices, OT devices, and IOT devices 212. In some aspects, user devices 214 may access the cloud security functionality of server 130 directly via cloud 140, remotely via a virtual private network (VPN), and/or may access cloud 140 (e.g., services and resources of cloud 140) via enterprise/on premises network 204. In particular, enterprise/on premises network 204 may be associated with a user or entity.

In embodiments, various resources may be available to user devices via cloud 140. Available resources may include one or more infrastructure cloud providers 206, which may include infrastructure as a service (IaaS) and/or platform as a service (PaaS) resources, such as Amazon Web Services, the Google Cloud Platform, Azure, etc. Available resources may additionally or alternatively include one or more software cloud providers 210, which may include SaaS resources such as Microsoft Office 365, Salesforce, Workday, etc. Available resources may additionally or alternatively include IoT service providers/hubs 208. As noted above, in some implementations, any of these available resources (e.g., SaaS, IaaS, and/or PaaS) may include platforms that are external to cloud 140, or at least external to the user devices connected to cloud 140. In these cases, some processes involved in providing cloud-based services (e.g., processes for performing operations with respect to the user devices) may execute on these external services and/or platforms. In embodiments, the functionality described herein for adaptive cloud security management may include deploying and running services (e.g., agents) on these external platforms to provide and/or support the adaptive cloud security management functionality described herein.

In distributed environments, traditional approaches to security, including security information and event management (SIEM), monitoring, detection and response (MDR)-based, and managed security services (MSS) architectures, may be implemented using point solutions. Examples of types of point solutions may include anti-virus, intrusion detection systems/intrusion prevention systems (IDS/IPS), digital asset management (DAM), web application firewall (WAF), data loss prevention (DLP), endpoint detection and response (EDR), etc.

Traditional point solutions by themselves have been inadequate for protecting cloud assets for several reasons. One reason is that the various point solutions may be non-standardized, so that the various points solutions at different computer systems and others assets of the cloud may use different security technologies, architectures, configurations, and visibility perspective that are inconsistent (e.g., different security products or different versions of the same product). Additionally, the assets in the cloud may change temporally, such that there may be different assets in the cloud at different times due to the distributed and elastic nature of the cloud. In these cases, a security solution that may have worked before may not be effective given the change in the environment. Yet another reason is that a point solution may not have real-time knowledge of assets in the cloud so the security protection may be incomplete as to assets that are not yet visible to the point solution. Still another reason, the shift to cloud-based applications and the transition to a microservices architecture may involve an ever greater number of assets that may interact and increased pathways between the assets, which may provide additional opportunities for security risks to enter the system, and which may increase the difficulty of monitoring and responding to risks. Another reason may be that the cloud architecture may lessen the controls that user devices may have over security as their computers and networks interact with remote infrastructure, applications, and databases that they may have no control over and of which the devices may be unaware due to the lack of transparency to the individual user devices as to the overall set of assets that are in the cloud.

In these traditional approaches, processing security events employs a linear, static, and manually-driven model in which point solutions are implemented at each device, network, and/or resource of the distributed system (e.g., a cloud-based system and/or a distributed system such as illustrated in FIGS. 1A-C and 2) to detect and address potential security risks. For example, a security model may be implemented on computer system infrastructure (e.g., devices and servers) with applications, and point solutions may be provided to protect the infrastructure and applications. Data about the infrastructure, applications, and point solutions that are implemented may be collected, parsed, enriched, and classified. Correlation of the data from different solutions has to be performed manually and recorded in a database, such as a SQL database. Rule and machine learning (ML)-based detection may be performed on the data using both manual and tool-based investigations. Data regarding threats that are detected and possible adverse responses to the threats may be collected from the various devices, and if a security problem is detected, an alert may be sent to a response person, such as a user, an IT administrator or a team at the system or application provider, that may escalate the issue, if warranted. A manual response and resolution may be generated, and the identified security problem(s) may be reported to a SOC to be analyzed manually or with one or more tools, such as a rule engine (e.g., ML/artificial intelligence (AI)) and a detection engine to find risks. If it is determined by the SOC that a risk is of concern, an alert may be sent to personnel at the software providers and internal departments or external providers, and the issue may be escalated so that a manual resolution may be developed, deployed and reported internally or to other entities. Once the problem is recognized and escalated it may take months to build a predictive model that can detect the problem in the future, and even longer for a software provider to deploy a solution such as in a future patch or update to the security software. Afterwards, it may be more months to determine the efficacy and accuracy of the solution. It is thus evident that the typical point solution and processing approach is not proactive in detecting and responding to risks and/or threats. As such, existing systems suffer from technological problems including the deployment of a solution that is based on an outdated model and that requires separate deployment on each device, network, and/or resource of the distributed system. In addition, such a solution offers no mechanism for real-time updating of the security model to respond to an attack as it happens. Thus, if a security model is deficient to respond to an attack, it may be months before the security model may be updated to be able to respond to the attack, which is of course wholly inefficient.

Additionally, another problem with the point solution approach is that different systems may generate disjointed security messages, and the systems processing the messages (e.g., MSS, MDR, SIEM) may have difficulty correlating and understanding the relevance of each of the messages in a dynamic and changing environment, such as in a cloud environment.

Some cloud-native security management solutions have been proposed, which may provide real-time, accurate visibility of infrastructure assets in the cloud. However, these cloud-native solutions, like point solutions, are not proactive in detecting and responding to risks.

In addition to the above shortcomings of existing solutions for managed security for such distributed systems, a notable challenge of conventional security solutions for distributed architectures is that while at least some conventional solutions rely on one or more of different types of machine learning to detect risks to computer assets (e.g., hardware, systems, and software), the machine learning uses positive and negative data points that may be periodically captured and used to develop a security model over an extended period of time (e.g., six weeks or more). Thus, it may take an extremely long time to train machine learning models in this manner and to develop solutions that resolve detected risks. Consequently, by the time the security models may be trained to detect for certain security threats, newer security threats and environmental changes may have developed that cannot be determined by the existing security model. Hence, the conventional solutions are reactive, not proactive, as they are designed based on a static environment and a security model developed for risks that have been detected in the past, often months ago. Meanwhile, environment changes and new security risks may develop and may not discovered for extended periods of time (e.g., change in assets, time delays inserted into malware to delay risk activation).

In aspects, the security model may be adaptively updated based on the system's characteristics to mitigate the risk, but may also, in response to a threat, detect the threat and, as the threat is occurring, update and/or modify the security model and/or the system to protect the system from the threat. In this manner, the automated and adaptive cloud security management of embodiments may not only provide for an adaptive security model based on system characteristics to deal with risk, but may also provide a dynamic and adaptive security model to respond to threats in real-time.

As noted above, the present disclosure provides techniques for automated and adaptive cloud security management that may address the above challenges in existing distributed and cloud-based security management solutions, and that may facilitate detecting risks and/or threats to cloud infrastructure, applications, and connected devices in a cloud environment, and adaptively responding and updating security models of the cloud environment based on the detected risks and/or threats and system characteristics to address the risks respond to the threats in real-time (or near real-time). With reference back to FIG. 1A, server 130 may include proactive protection servicer 133, security model validator 134, and security model adaptor 135. These components of server 130, along with the other components of server 130, may individually and/or cooperatively operate to provide automated and adaptive cloud security management in accordance with aspects of the present disclosure.

Proactive protection servicer 133 may be configured to proactively detect security characteristics of assets in the cloud, which may include security risks to the assets. It is noted that "assets" may refer to all or portion of the infrastructure (e.g., hardware), systems, devices, and/or applications (e.g., software) of a cloud-based architecture (e.g., cloud 140). Security risks may refer to, for example, a vulnerability, misconfiguration, security threat or an anomaly (e.g., a transaction request gets no response), that might make the system vulnerable to a security breach, malware attack, etc.

In aspects, the configuration of proactive protection servicer 133 to detect security risks to assets in the cloud may include functionality to perform asset and configuration discovery, relationship and application profiling, policy and control testing and validation, and/or synthetic testing. The functionality of proactive protection servicer 133 may provide capabilities to proactively discover security information on assets of the cloud and to use that information to determine whether there are security risks based on controls and/or policies of a security model applicable to the cloud.

Proactive protection servicer 133 may be configured to identify assets in the cloud or in communication with the cloud, and to detect the configuration of cloud assets. Asset and configuration discovery may include collecting asset information, such as information on the architecture, applications, existing point solutions, and the configuration of the various assets. As will be appreciated, asset and configuration discovery facilitates a measure of control for a user over the security posture of the cloud-based system even when there are multiple assets with multiple configurations affecting the security posture and which are not controlled by the user.

In addition, proactive protection servicer 133 may be configured to identify relationships and connections between the various assets. In some aspects, connections/relationships may include correlation between the various assets. For example, In embodiments, correlation may include, for example, mapping one variable from a first asset to a different variable in another assets that a same entity (e.g., IP address, user) by analyzing nomenclature and actions performed by the different assets. In this case, one asset may refer to an IP source address in a message as "IP" while another asset refers to the same IP address "source IP" or "source." As another example, a syntax for specifying a user by one asset may be "user" while the syntax in a different asset for identifying a user is "userID." In aspects, the timing, sequencing, and outcome attributes associated with a transaction between different assets may be correlated to identify connections and/or relationships between the assets. Relationship and application profiling may also include obtaining a profile of the system to be analyzed for security risks.

As will also be appreciated, the functionality of proactive protection servicer 133 to provide asset and configuration discovery and relationship and application profiling may provide data as to a state of the cloud environment, and the state of detection and response models in which the platform is operating. This information may be used to create a dynamic and single linked view of cloud assets, their relationship, identities, and state of risk in relationship to a current environment state.

In some embodiments, asset and configuration discovery and relationship and application profiling may be performed using synthetic testing, which facilitate proactively discovering the identity of assets, linkage to the assets, and a correlation relationship between the assets. In these embodiments, transactions may be "tainted" by including synthetic markers in the transaction. The tainted transaction request and responses thereto that include the marker information may be tracked and associated with each other such as by analyzing data logs, metrics, and events, and the analysis may be used to identify the assets, usage of the assets, and linkage and relationship information for the assets. Synthetic testing and active training will be discussed in more detail below.

In embodiments, policy and control testing and validation may include testing the cloud assets based on the policies and controls in the security model of the cloud-based system. The security model may include rules, policies, and/or controls for responding to, and/or remediating security risks. A transaction request may be transmitted to one or more of the identified assets implementing the security model. In aspects, the transaction request may include a synthetic marker (e.g., in accordance with the disclosure herein) that may be traceable and may facilitate testing that the rules, policies, and/or controls established in the security model are valid. For example, a particular transaction request that is specifically designed to test the system and includes data that should be blocked by the one or more policies is transmitted to one or more of the assets to test that the policies are actually working and/or enforced. Synthetic testing with respect to this policy and control testing and validation functionality will be discussed in more detail below.

Security model validator 134 of server 130 may be configured to perform an automated investigation and resolution that automatically investigates whether application of one or more rules, policies, and/or controls in the security model appropriately results in detection of risks, and determines whether one or more of the risks is mitigated or resolved by application of the security model. In aspects, the automated investigation and resolution may be based on results of monitoring and validation performed by a SOC (e.g., SOC 202 of FIG. 2) and may include application of ML, and automated algorithms to monitor the assets, resources, and applications of the cloud for risks, and to detect analytics based on the monitoring to determine the presence of a security risk.

In aspects, the automated investigation and resolution may be performed in response to one or more of a trigger, a particular scenario, or information (e.g., internal information or information received from an outside source) indicating a potential security threat. In embodiments, the risk detection may be based on detection algorithms that may be automatically performed with interactive action bots that correlate with data obtained by proactive protection servicer 133 for the current configuration of the assets and may conduct extended testing using actual trigger parameters substantially in real-time. The interactive action bots of security model validator 134 may be dynamic and may interact and communicate with other bots in a distributed neural networks approach over extended periods of time to learn from feedback from other action bots and post-action bots that may be activated by security model adaptor 135.

Security model adaptor 135 of server 130 may be configured to enforce and adapt the security model, and to perform training, based on information provided by security model validator 134. In particular, security model adaptor may be configured to, upon detection of a risk based on the security model, attempt to mitigate the risk. In aspects, mitigating the risk may include isolating or quarantining the risk, disabling a user account, updating software, blocking an IP address, etc. In aspects, this may include applying machine learning algorithms based on whether or not the effectiveness of the security model was validated by security model validator 134, and determining, e.g., using post-action bots, whether the rules, policies, and/or controls of the security model have mitigated the detected risk or have caused an unexpected result. For example, post-action bots may be used after a mitigating action has been taken to test whether or not the risk has been remediated, wholly or partially, or whether the "fix" has "side effects", e.g., it may have worsened the identified risk. As such, the post-action bots may be used to "validate" whether a solution to a particular risk has worked. In embodiments, one or more post-action bots may be used to check for each risk that was identified at a particular time to validate the solution.

In aspects, security model adaptor 135 may be configured to modify and update the security model. In aspects, the updated security model may be used in a subsequent round of validation testing, such as where a risk may not have been fully remediated or may have caused an unexpected result. In embodiments, post-action bots may also be used to execute the modification, updating, or replacement of the security model. The modified, updated, or replacement security model may be used as a feedback and sent to proactive protection servicer 133 for further operations consistent with the modified/updated security model. In some aspects, security model adaptor 135 may be configured to manage and maintain iterations of the security model (e.g., as the security model may be updated and modified), including the iterations of the security model both before and after modification. In embodiments, data obtained from proactive protection servicer 133, security model validator 134, and security model adaptor 135 may be stored at data store 136, and may be retrieved by any component of server 130 for analysis in accordance with the present disclosure.

Figure 3:
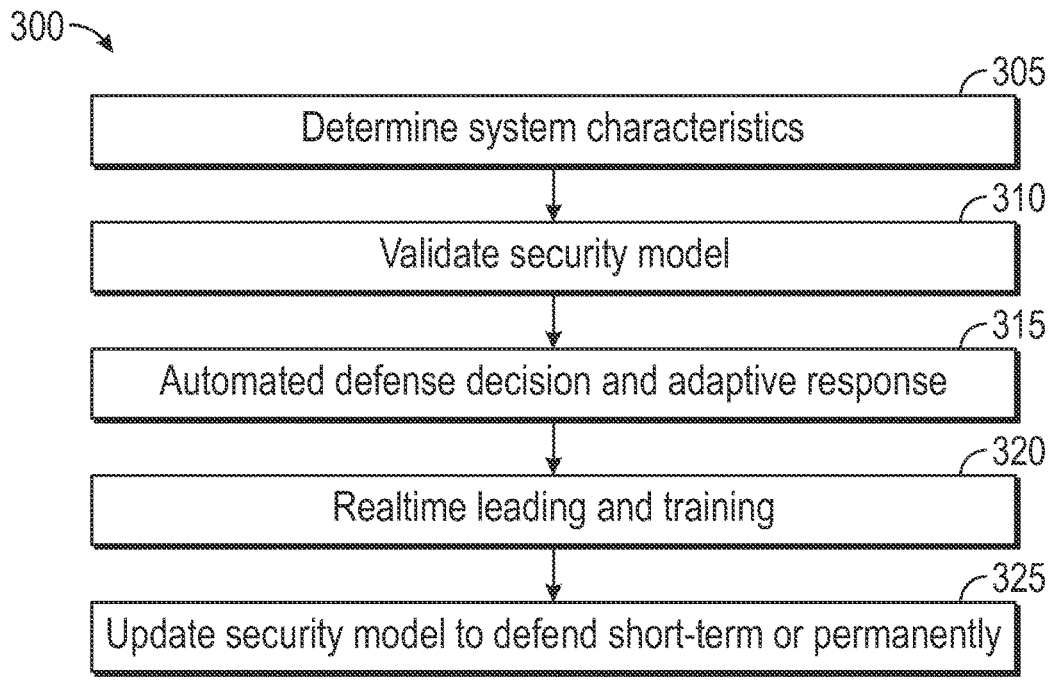
FIG. 3 is a flowchart illustrating a process for automated and adaptive cloud security management in accordance with embodiments of the present disclosure.

FIG. 3 is a flowchart illustrating a process 300 for automated and adaptive cloud security management in accordance with embodiments of the present disclosure. For example, the functions illustrated in the example blocks shown in FIG. 3 may be performed by server 130 of FIG. 1A and may be implemented in system 200 of FIG. 2 according to embodiments herein. In general terms, an implementation of process 300 in accordance with the present disclosure allows a cloud-based system security management solution to be proactive and automated, rather than being reactive and waiting a long time for machine learning systems to be trained to identify and address new risks and/or threats. As a result, such a system may achieve a much more rapid result by using at least a combination of synthetic testing for asset and configuration discovery and security model validation, interactive investigation, action-bot and post-action bots, and internal detection and security model updating.

At block 305, characteristics of a cloud-based system (e.g., system 200 of FIG. 2) are determined. As used herein, a system characteristics may refer to the environment of the cloud-based system. In aspects, determining the system characteristic may include discovering assets of the system, detecting asset configurations, identifying rules, policies, and/or controls of a security model, determining vulnerabilities of the system and/or of the assets, etc. The assets to be discovered may include IaaS, PaaS, SaaS, FaaS, IoT service providers, etc. The determination of the system characteristic may be performed in accordance with the functionality of proactive protection servicer 133 as described above, and may include performing asset and configuration discovery, relationship and application profiling, policy and control testing and validation, and/or synthetic testing, as discussed in detail above.

In a particular implementation, determining system characteristics may include identifying assets and configuration of assets in the cloud or in communication therewith, and profiling identities of the assets, relationships of the assets, and a linkage of the respective asset to other assets. In some embodiments, determining system characteristics may also include identifying rules, controls, and/or policies of a security model implemented on the identified assets. The rules, controls, and/or policies of the security model may be applicable for remediating security risks and/or for responding to security threats and/or attacks.

At block 310, the security model(s) implemented on the various assets is validated based on the determined system characteristics. The security model may include rules, policies, and/or controls for responding to threats, and/or remediating security risks. In aspects, the determined system characteristics may include information on cloud asset identities, asset relationships and linkages to other assets, configuration of the assets, vulnerabilities of the assets, transaction timing and sequences, outcome attributes between assets, and/or asset transaction behavior (e.g., in response to a transaction request). Any combination of these determined system characteristics may be used to validate the security model. Validating the security model may include determining whether the rules, policies, and/or controls of the security model are correctly enforced, determining whether security risks are detected by the rules, policies, and/or controls of the security model, whether risks are mitigated by the rules, policies, and/or controls of the security model, and/or whether responses to threats and attacks are adequate as provided by the rules, policies, and/or controls of the security model. In aspects, the validation of the security model at block 310 may be performed in accordance with the functionality of security model validator 134 as described above.

At block 315, an automated defense decision and adaptive response is performed. In aspects, the automated defense decision and adaptive response may include performing an automated investigation and resolution that automatically investigates whether application of one or more rules, policies, and/or controls in the security model appropriately results in detection of risks and/or threats. In addition, a determination as to whether the risks and/or threats are mitigated or resolved by application of the security model may also be made. As will be appreciated, responding to the detected risk and/or threat may include application of the security model, which may be validated (and adapted). In this manner, the techniques described herein provide an adaptive response to the detected risks and/or threats. For example, if an attack is detected, a security model may include rules that may be automatically executed to respond to the attack. However, based on operations such as described with reference to blocks 305-315, a system may not only respond to the attack based on the security model rules, but may also validate whether the rules of the security model are sufficient to respond to the attack, or even if the rules were executed at all. Where the response to the attack may not be adequate, the system may adapt the response to the threat based on the determined deficiencies of the security model.

At block 320, real-time leading and training is performed. In aspects, the automated decision and response may be used to lead the response in real-time and to provide training in order to update the machine learning algorithms that are used in the automated response. As noted above, this automated and adaptive process provides a way to respond to threats in near real-time as it allows for continuous adaptation of the security model as the threat occurs. Thus, if the security model is inadequate to respond to the threat, the security model is automatically updated, as the attack occurs, to adequately respond. In embodiments, machine learning algorithms may be used to perform trigger-based actions used for validating, adjusting, and extending the security models, and to extend the classification of results with action bots (e.g., interactive response bots) used for self-training. In additional or alternative embodiments, security model validation may be performed using reinforcement learning to adjust and provide data to training supervised security models that align with the environment in which they operate (e.g., workload, latency, application state, etc.) and to update the model timing and provide validated good and bad data detections from and in response to the action bots (e.g., interactive response bots).

At block 325, the security model is updated. In aspects, updating the security model may include updating the security model based on the validation results such as described with reference to block 310, the automated defense decision and adaptive response such as described with reference to block 315, and the real-time leading and training such as described with reference to block 320. For example, the validation results (e.g., whether risks are detected, and whether risks are mitigated) may be used to adapt and update the security model based on the results. In aspects, updating the security model may include application of machine learning algorithms such as reinforcement learning and model training/updating and calibration. For example, updating the security model may be performed using semi-supervised learning and/or supervised learning algorithms to perform trigger-based actions used for validating, adjusting, and extending the security models, and to extend the classification of results with action bots and post-action bots used for self-training. In additional or alternative embodiments, security model validation may be performed using reinforcement learning to adjust and provide data to training supervised security models that align with the environment in which they operate (e.g., workload, latency, application state, etc.) and to update the model timing and provide validated good and bad data detections from and in response to the action bots (e.g., interactive response bots).

In some embodiments, updating the security model may include attempting to remediate a detected risk based on the security model, and then determining (e.g., at block 310) that the risk was not fully remediated by the application of the security model, or that the application model may have caused an unexpected result (e.g., may have worsen the security risk). In that case, the security model may be modified, updated, and/or replaced based on the determination. In aspects, the modified, updated, or replacement security model may be used as a feedback and sent to proactive protection servicer 133 for further operations consistent with the modified/updated security model, such as described with reference to block 305.

As noted above, synthetic testing may be used to proactively discover identity linkages, relationships, transaction flows, etc. within the distributed system, and may also be used to determine whether a particular security model (or rules, controls, and/or policies of a security model) are being correctly enforced in a cloud-based system. In general, synthetic testing may include simulating various operations (e.g., transactions involving the cloud-based system) in which the operations are "tainted" with a synthetic marker, and then reviewing the results of the simulated operations (e.g., an output and/or log data, such as data from a log file(s) or from other log data sources, associated with the operations) to make determinations. In particular, the results and/or response of the simulated operations may provide information about asset identities, asset configurations, asset relationships, asset vulnerabilities, security policy rules enforcement, etc.

In embodiments, synthetic testing may include initiating and/or requesting a transaction using a synthetic marker to "taint" the transaction. For example, a particular operation for adding a user to a system may be initiated on a graphical user interface provided to a user. The transaction request may include a form with a field to specify the user name to be added. In embodiments, a synthetic marker may be used any of the form fields. In this particular example, a synthetic marker may be used for any combination of the various fields that are to be input for adding a user (e.g., username, last name, first, name, address, telephone number, etc.). A synthetic marker may be a known unique or special identifier that may allow the transaction to be traced. As was mentioned above, different assets in the cloud-based system may use different nomenclatures for similar type of data. For example, a particular asset may use "username" and another asset may use "user ID" to refer to the same type of data. In that case, tainting the transaction with a special identifier for the user name may allow for tracing the synthetic marker throughout the transaction, which may reveal assets involved in the transaction (e.g., allowing for asset discovery) and may provide information on asset configuration and asset relationships to each other based on the transaction flow.

It is noted that the synthetic marker may be any marker that may be traceable throughout the transaction (e.g., by reviewing transaction log data) and may include any of, for example, a user name or identification, a particular credit card number, or a type of item purchased, an unusual value for a variable embedded in the transaction request, etc. The synthetic marker used (e.g., the string used as a synthetic marker) may be based on the type of transaction request, may be based on the available fields in the transaction request form, and/or may be based on system constraints (e.g., the field only allows a particular type/format of entry). In some embodiments, an automated process may be used to determine the system constraints with respect to the an input field.

Another form of tainting a transaction may be based on timing. For example, a series of multiple transactions may result in a particular cadence of the associated input and responses. In this case, the particular cadence may be used to determine that assets exhibiting that particular cadence may belong to the same transactions. For example, multiple transactions may be initiated, in which some transactions may be tainted and some transactions may not be tainted. Algorithms may be applied to transaction data and based on the timing and the tainting, a timing associated with the transactions may be determined. The determined timing may then be used to identify transactions associated with the transaction by determining that the timing of those transactions matches and/or corresponds to the determined timing.

As such, the synthetic marker may be used to determine asset relationships and linkage relationships, by tracking transaction flow throughout the various assets. For example, for the add user operation, messages between the various assets that are responsive to the transaction request may include the synthetic marker, which may be detected in the respective data exchanges indicating that the assets are linked. The data in the exchanges may further be used to determine relationships between the assets.

Figure 4:
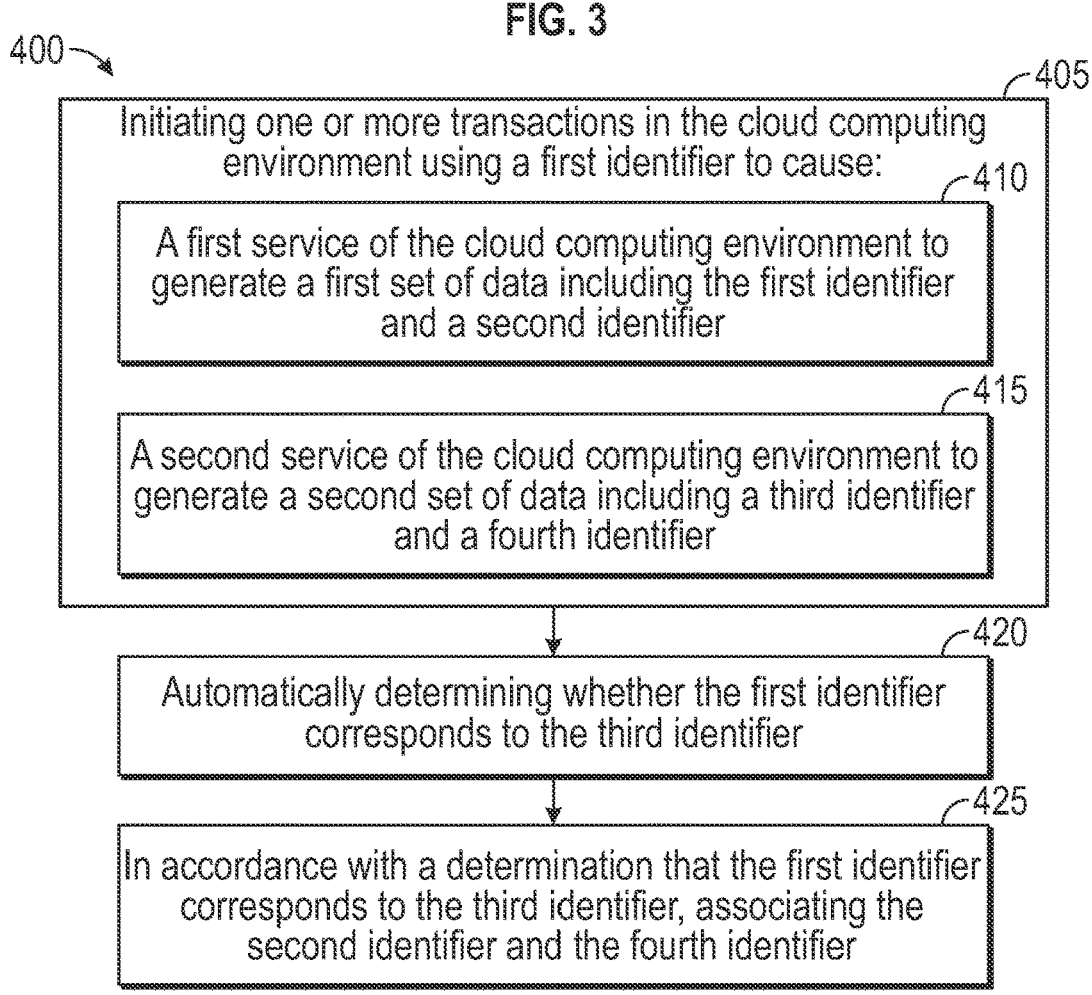
FIG. 4 is a flowchart illustrating a process for linking assets in a cloud-based system in accordance with embodiments of the present disclosure.

In aspects, after a transaction request has been tainted with a synthetic marker, and the transaction has been processed, a response to the transaction request and/or log data associated with the transaction may be obtained to and analyzed to perform relationship and linkage of the assets. Log data may be pulled (e.g., requested) from each of the assets in the system, or may be pushed from the assets. The response and/or log data from the various cloud assets may be analyzed to determine elements that may include or be associated with the synthetic marker. The assets associated with log data including the synthetic marker may be linked to each other. For example, log data from a first asset may include a field identifier that includes the synthetic marker, and log data from a second asset may also include field identifier that includes the synthetic marker. In that case, a linkage may be generated between the first and second asset. FIG. 4 is a flowchart illustrating a process 400 for linking assets in a cloud-based system in accordance with embodiments of the present disclosure. In particular, process 400 may leverage synthetic testing using a synthetic marker to generate linkages between the assets. In aspects, process 400 may be part of a process used to implement any of blocks 305, 310, 315, and 320 of FIG. 3.

At block 405, one or more transactions may be initiated in a cloud environment using a first identifier. In aspects, the first identifier may be a tainted identifier. For example, the one or more transactions may include an operation to add a user to the system (e.g., a new user may be added to an application implemented using the cloud-based system). In this case, the user ID field of the transaction request may be tainted with a synthetic marker. The one or more transactions may cause, at block 410, a first asset of the cloud to generate a first set of data (e.g., a first log file). The first set of data may include a first identifier (e.g., the tainted user ID), and may also include a second identifier (e.g., an account ID). The one or more transactions may also cause, at block 415, a second asset of the cloud to generate a second set of data (e.g., a second log file) associated with the second asset. The second set of data may include a third identifier (e.g., the tainted user ID) that matches the tainted identifier. The second set of data may also include a fourth identifier (e.g., email address). At block 420, an automatic determination is made as to whether the first identifier corresponds to (e.g., matches) the third identifier. At block 425, in accordance with a determination that the first identifier corresponds and/or matches to the third identifier, a linkage is generated between the first and second assets. The linkage may include associating the second identifier (e.g., an account ID) and the fourth identifier (e.g., email address).

It is noted that in accordance with the present disclosure, process 400 may be a fully automated process in which the linkages between the assets may be generated automatically, using, e.g., ML algorithms and/or other automated processes. In addition, the information obtained by the synthetic testing may be used to train and self-calibrate the ML models. This may allow systems implemented in accordance with the present disclosure to be proactive, rather than reactive, as discussed above.

In aspects, the log data from the second asset may be obtained based on the tainted identifier. Additionally, the synthetic testing may be performed periodically and repeatedly such that the linkages between the assets may be modified, updated, and/or removed. For example, in the example above, after associating the second identifier and the fourth identifier, an automatic determination may be made as to whether the first identifier matches the third identifier, and in accordance with a determination that the first identifier does not correspond to the third identifier, the second identifier and the fourth identifier maybe disassociated. This functionality to dissociate assets may allow the system to adapt to changes in linkages over time.

In aspects, the log files analyzed may be associated with different transactions with respect to the various assets. For example, the first log file may be associated with a transaction associated with a first asset, and the second log file may be associated with a different transaction associated with the second asset. In this case, the different transactions may be part of the overall transaction (e.g., the transaction to add a user).

In embodiments, initiating the one or more transactions may be based on a timing threshold with respect to prior transactions. For example, a determination as to whether a threshold time has elapsed since a transaction was last initiated may be determined. When it is determined that the threshold time has elapsed since a transaction was last initiated, the one or more transactions may be initiated. Otherwise, if it is determined that the threshold time has not elapsed since a transaction was last initiated, the one or more transactions may not be initiated.

In aspects, tainting may be applied to all transactions, and in some cases multiple, and even all, fields of a transaction may be tainted. In this case, log data may be searched in all directions (e.g., backwards and forward with respect to the transaction flow) in order to find linkages.

In some embodiments, in addition to or instead of reviewing log files to find linkages, APIs may be used to find folders. For example, a tainted transaction may be requested. After the transaction has been requested, API calls may be used to determine whether folders having the tainted synthetic marker are present, and/or whether "taint" folders may have been created within a particular time. This information may be used to link assets to each other.

As noted above, synthetic testing, using synthetic markers, may be used to test the effects of the existing security model on the various cloud assets in order to validate the security models. The results of the synthetic testing may also be used to train the assets in the adapted security policies and controls. In some embodiments, synthetic testing may be performed in order to auto calibrate the ML algorithms associated with operations described herein (e.g., for proactive protection services, security model validation, security model adapting, etc.). In particular, where ML algorithms may be used to determine security risks based on timing, sequence, or particular security controls, synthetic testing may be performed to calibrate the ML algorithms by causing a classification of the results of the synthetic testing. In this manner, synthetic testing may allow the system to be automatically adaptive and flexible to changes in the system.

In embodiments, one or more transaction requests may be tainted using a synthetic marker, as discussed above. In these embodiments, the synthetic marker may be a special synthetic marker that includes a risk trigger to test the response of one or more assets to the existing policies and controls of the security mode. In this manner, the security model is checked for proper operation. For example, a particular synthetic marker may include a trigger of a positive behavior, in which the expected response would be a successful response (e.g., the synthetic marker should be allowed as an input). In this case, a successful transaction may indicate that the security model is being properly enforced. It is noted that these operations, and the operations described below are automatic operations that do not involve manual input.

In another example, a synthetic marker may include a trigger of a negative behavior, in which the expected response would be a failure (e.g., the synthetic marker should not be allowed). In this case, a successful transaction may indicate that the security model is not being properly enforced. In some embodiments, the trigger may be associated with a particular security control or rule of the security model (e.g., password enforcement, credit card field, etc.). For example, where a system allows an invalid credit card number in a field without a notification or rejection of the invalid number, this would indicate a deficiency of the security model.

In addition, synthetic testing may allow for validation of the logging infrastructure of the system. For example, where a negative trigger may have been rejected, or a positive trigger allowed, a synthetic marker may allow for determining whether the rejection, or allowance, was properly logged. In this case, the log files may be reviewed based on the synthetic marker to determine if the transaction was properly logged.

FIGS. 5A-5B illustrate, with pseudo-code examples, an example of how synthetic markers may be used to taint a transaction for synthetic testing in accordance with exemplary embodiments of the present disclosure. In embodiments, as discussed above, synthetic testing may be used to generate linkages between assets and relationships between the assets based on the synthetic testing. For example, when a synthetic marker is inserted into a transaction request, the synthetic marker may be included in various and different messages generated in response to one or more transaction requests associated with the tainted transaction request. Thus, for example, the presence of a distinctive user name within messages may be used to link the user to a particular ID, privileges at or relationships with the assets, access to the assets, priorities, the user's patterns of behavior, etc.

The first row of Table 500 shows an example of how a synthetic marker may allow for automated asset linkage, discovery, and the establishment of a relationship between the various cloud assets based on a user group that is associated with a particular synthetic marker that may be used. The second row of table 500 shows an example of how synthetic markers and transaction tainting may be used to link and correlate the assets, including infrastructure systems and applications. The third row of table 500 shows an example of how event times for each version of the record may be captured and updated for linking, validating, and calibration using ML with time analysis. The fourth row of table 500 shows an example of how synthetic markers may be used for asset discovery. The fifth row of table 500 shows an example of how an action and response that uses a synthetic marker may be used for automated linkage, validation and any additional relationships.

Figure 6:
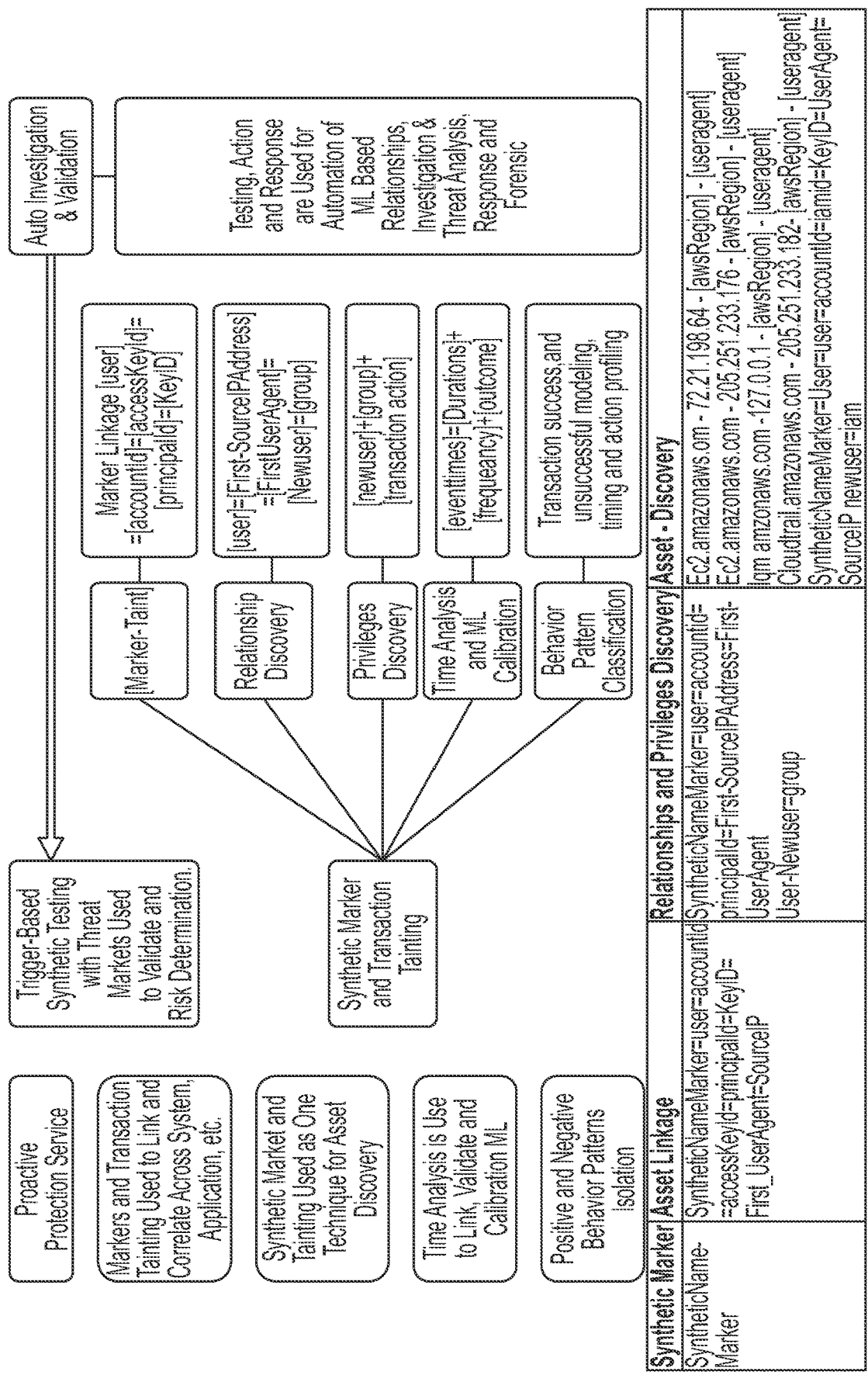
FIG. 6 shows an overview of synthetic markers use to discover identity, linkage, and relationship of assets in accordance with embodiments of the present disclosure.

FIG. 6 shows an overview of the use of synthetic markers to discover identity, linkage, and relationship of assets in accordance with exemplary embodiments of the present disclosure. While the above-described system uses the proactive method, system, and product described above with respect to ML for the purposes of security, a similar approach may be used in other embodiments of the present invention for proactively updating ML models, such as with the use of synthetic testing, investigation and validation, and proactive modification of ML models to analyze other types of data points to improve other types of network analysis. For example, unsupervised learning using regression ML may be used for market-based analysis, semi-supervised learning may be used for text classification or lane-finding based on GPS data, supervised learning may be used for medical imaging, and reinforcement learning 504 may be used for optimized marketing and for control functions such as for control of driverless cars.

The foregoing description of specific embodiments, as described with reference to FIGS. 1-6, has been presented with reference to specific embodiments for purpose of explanation. However, the illustrative discussions set forth above are not intended to be exhaustive or to limit the invention to the precise forms disclosed in any manner. Many modifications and variations are possible in view of the above teachings. Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1-6 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer system configured to interface with a cloud computing environment, the computer system comprising:
   one or more processors;
   memory storing one or more programs configured to be executed by the one or more processors, the one or more programs including instructions for:
      initiating, at the computer system, one or more transactions in the cloud computing environment by transmitting a first identifier to the cloud computing environment to cause:
         a first service of the cloud computing environment to generate a first set of data including the first identifier and a second identifier, wherein the first identifier includes a first synthetic marker, and
         a second service of the cloud computing environment to generate a second set of data including a third identifier and a fourth identifier, wherein the third identifier includes a second synthetic marker;
      subsequent to initiating the one or more transactions, automatically performing a process to selectively generate a linkage, the process including:
         determining, at the computer system, whether the first identifier is associated with the third identifier, including:
            tracing the one or more transactions in the cloud computing environment based on at least one of the first synthetic marker and the second synthetic marker;
            identifying a plurality of services of the cloud computing environment based on the traced one or more transactions, wherein the plurality of services includes the first service and the second service;
            obtaining, from the plurality of services, the first set of data and the second set of data; and
            comparing the first identifier to the third identifier according to a set of predetermined criteria; and
         in accordance with a determination that the first identifier is associated with the third identifier:
            associating the second identifier with the fourth identifier;
            identifying a relationship between the first and second services based on the association between the second and fourth identifiers;
            generating a linkage between a third service of the cloud computing environment and a fourth service of the cloud computing environment based on the identified relationship; and
            adaptively updating a security model based on the identified relationship.

2. The computer system of claim 1, wherein the one or more programs include instructions for:
   obtaining the second set of data based on the first identifier.

3. The computer system of claim 1, wherein determining whether the first identifier corresponds to the third identifier is based on a timing and results of the generation of the first and second sets of data.

4. The computer system of claim 1, wherein the first set of data includes log data associated with a first transaction of the one or more transactions and the second set of data includes log data associated with a second transaction of the one or more transactions.

5. The computer system of claim 1, wherein the one or more programs include instructions for:
   searching a storage device communicatively coupled to the cloud computing environment to obtain the second set of data.

6. The computer system of claim 1, wherein the first identifier is a user ID including a unique or special identifier that facilitates tracing of the first identifier.

7. The computer system of claim 1, wherein initiating one or more transactions in the cloud computing environment includes:
   determining that a threshold amount of time has elapsed since a transaction was last initiated; and
   in response to determining that the threshold amount of time has elapsed since a transaction was last initiated, initiating the one or more transactions.

8. The computer system of claim 1, wherein the first identifier is a user ID, an account ID, or a combination thereof.

9. The computer system of claim 1, wherein the one or more transactions includes generating an instance of an operating system, creating a user account, adding a user account to a group, or a combination thereof.

10. The computer system of claim 1, wherein the first identifier is a unique identifier configured to facilitate the automatically determining whether the first identifier corresponds to the third identifier and track the one or more transactions in the first set of data and the second set of data.

11. The computer system of claim 1, wherein the one or more transactions are a first set of transactions, the one or more programs including instructions for:
   initiating a second set of transactions by transmitting the first identifier to the cloud environment to cause:
      the first service to generate a third set of data including the first identifier, and
      the second service to generate a second set of data including a fifth identifier; and
   determining whether the first identifier is associated with the fifth identifier; and
   in accordance with a determination that the first identifier is not associated with the fifth identifier:
      disassociating the second identifier from the fourth identifier.

12. The computer system of claim 1, wherein:
   the third service is the first service; and
   the second service is the fourth service.

13. The computer system of claim 1, wherein:
   the first identifier includes a third synthetic marker, and
   determining whether the first identifier is associated with the third identifier includes:
      determining whether the first set of data is associated with the third synthetic marker; and
      determining whether the third set of data is associated with the third synthetic marker.

14. The computer system of claim 13, wherein a type of the third synthetic marker is based on a type of the one or more transactions.

15. A non-transitory computer-readable storage medium storing one or more programs configured to be executed by one or more processors of an electronic device configured to interface with a cloud computing environment, the one or more programs including instructions for:
   initiating, at the computer system, one or more transactions in the cloud computing environment by transmitting a first identifier to the cloud computing environment to cause:
      a first service of the cloud computing environment to generate a first set of data including the first identifier and a second identifier, wherein the first identifier includes a first synthetic marker, and
      a second service of the cloud computing environment to generate a second set of data including a third identifier and a fourth identifier, wherein the third identifier includes a second synthetic marker;
   subsequent to initiating the one or more transactions, automatically performing a process to selectively generate a linkage, the process including:
      determining, at the computer system, whether the first identifier is associated with the third identifier, including:
         tracing the one or more transactions in the cloud computing environment based on at least one of the first synthetic marker and the second synthetic marker;
         identifying a plurality of services of the cloud computing environment based on the traced one or more transactions, wherein the plurality of services includes the first service and the second service;
         obtaining, from the plurality of services, the first set of data and the second set of data; and
         comparing the first identifier to the third identifier according to a set of predetermined criteria; and
      in accordance with a determination that the first identifier is associated with the third identifier:
         associating the second identifier with the fourth identifier;
         identifying a relationship between the first and second services based on the association between the second and fourth identifiers;
         generating a linkage between a third service of the cloud computing environment and a fourth service of the cloud computing environment based on the identified relationship; and
         adaptively updating a security model based on the identified relationship.

16. The non-transitory computer-readable storage medium of claim 15, wherein the one or more programs include instructions for:
   obtaining the second set of data based on the first identifier.

17. The non-transitory computer-readable storage medium of claim 14, wherein determining whether the first identifier corresponds to the third identifier is based on a timing and results of the generation of the first and second sets of data.

18. The non-transitory computer-readable storage medium of claim 14, wherein the first set of data includes log data associated with a first transaction of the one or more transactions and the second set of data includes log data associated with a second transaction of the one or more transactions.

19. The non-transitory computer-readable storage medium of claim 14, wherein the one or more programs include instructions for:
  searching a storage device communicatively coupled to the cloud computing environment to obtain the second set of data.

20. The non-transitory computer-readable storage medium of claim 14, wherein the first identifier is a user ID including a unique or special identifier that facilitates tracing of the first identifier.

21. The non-transitory computer-readable storage medium of claim 14, wherein initiating one or more transactions in the cloud computing environment includes:
  determining that a threshold amount of time has elapsed since a transaction was last initiated; and
  in response to determining that the threshold amount of time has elapsed since a transaction was last initiated, initiating the one or more transactions.

22. The non-transitory computer-readable storage medium of claim 15, wherein the first identifier is a user ID, an account ID, or a combination thereof.

23. The non-transitory computer-readable storage medium of claim 15, wherein the one or more transactions includes generating an instance of an operating system, creating a user account, adding a user account to a group, or a combination thereof.

24. The non-transitory computer-readable storage medium of claim 15, wherein the first identifier is a unique identifier configured to facilitate the automatically determining whether the first identifier corresponds to the third identifier and track the one or more transactions in the first set of data and the second set of data.

25. The non-transitory computer-readable storage medium of claim 15, wherein the one or more transactions are a first set of transactions, the one or more programs including instructions for:
  initiating a second set of transactions by transmitting the first identifier to the cloud environment to cause:
    the first service to generate a third set of data including the first identifier, and
    the second service to generate a second set of data including a fifth identifier; and
  determining whether the first identifier is associated with the fifth identifier; and
  in accordance with a determination that the first identifier is not associated with the fifth identifier:
    disassociating the second identifier from the fourth identifier.

26. The non-transitory computer-readable storage medium of claim 15, wherein:
  the third service is the first service; and
  the second service is the fourth service.

27. The non-transitory computer-readable storage medium of claim 15, wherein:
  the first identifier includes a third synthetic marker, and
  determining whether the first identifier is associated with the third identifier includes:
    determining whether the first set of data is associated with the third synthetic marker; and
    determining whether the third set of data is associated with the third synthetic marker.

28. The non-transitory computer-readable storage medium of claim 27, wherein a type of the third synthetic marker is based on a type of the one or more transactions.

29. A method, comprising:
  at an electronic device configured to interface with a cloud computing environment:
    initiating, at the computer system, one or more transactions in the cloud computing environment by transmitting a first identifier to the cloud computing environment to cause:
      a first service of the cloud computing environment to generate a first set of data including the first identifier and a second identifier, wherein the first identifier includes a first synthetic marker, and
      a second service of the cloud computing environment to generate a second set of data including a third identifier and a fourth identifier, wherein the third identifier includes a second synthetic marker;
    subsequent to initiating the one or more transactions, automatically performing a process to selectively generate a linkage, the process including:
      determining, at the computer system, whether the first identifier is associated with the third identifier, including:
        tracing the one or more transactions in the cloud computing environment based on at least one of the first synthetic marker and the second synthetic marker;
        identifying a plurality of services of the cloud computing environment based on the traced one or more transactions, wherein the plurality of services includes the first service and the second service;
        obtaining, from the plurality of services, the first set of data and the second set of data; and
        comparing the first identifier to the third identifier according to a set of predetermined criteria; and
      in accordance with a determination that the first identifier is associated with the third identifier:
        associating the second identifier with the fourth identifier;
        identifying a relationship between the first and second services based on the association between the second and fourth identifiers;
        generating a linkage between a third service of the cloud computing environment and a fourth service of the cloud computing environment based on the identified relationship; and
        adaptively updating a security model based on the identified relationship.

30. The method of claim 29, further comprising:
  obtaining the second set of data based on the first identifier.

31. The method of claim 29, wherein determining whether the first identifier corresponds to the third identifier is based on a timing and results of the generation of the first and second sets of data.

32. The method of claim 29, wherein the first set of data includes log data associated with a first transaction of the one or more transactions and the second set of data includes log data associated with a second transaction of the one or more transactions.

33. The method of claim 29, further comprising:
  searching a storage device communicatively coupled to the cloud computing environment to obtain the second set of data.

34. The method of claim 29, wherein the first identifier is a user ID including a unique or special identifier that facilitates tracing of the first identifier.

35. The method of claim 29, wherein initiating one or more transactions in the cloud computing environment includes:

determining that a threshold amount of time has elapsed since a transaction was last initiated; and in response to determining that the threshold amount of time has elapsed since a transaction was last initiated, initiating the one or more transactions.

36. The method of claim 29, wherein the first identifier is a user ID, an account ID, or a combination thereof.

37. The method of claim 29, wherein the one or more transactions includes generating an instance of an operating system, creating a user account, adding a user account to a group, or a combination thereof.

38. The method of claim 29, wherein the first identifier is a unique identifier configured to facilitate the automatically determining whether the first identifier corresponds to the third identifier and track the one or more transactions in the first set of data and the second set of data.

39. The method of claim 29, wherein the one or more transactions are a first set of transactions, the method further comprising:
    initiating a second set of transactions by transmitting the first identifier to the cloud environment to cause:
        the first service to generate a third set of data including the first identifier, and
        the second service to generate a second set of data including a fifth identifier; and
    determining whether the first identifier is associated with the fifth identifier; and
    in accordance with a determination that the first identifier is not associated with the fifth identifier:
        disassociating the second identifier from the fourth identifier.

40. The method of claim 29, wherein:
the third service is the first service; and
the second service is the fourth service.

41. The method of claim 29, wherein:
the first identifier includes a synthetic marker, and
determining whether the first identifier is associated with the third identifier includes:
    determining whether the first set of data is associated with the third synthetic marker; and
    determining whether the third set of data is associated with the third synthetic marker.

42. The method of claim 41, wherein a type of the third synthetic marker is based on a type of the one or more transactions.

* * * * *